US007588651B2

(12) United States Patent
Engl et al.

(10) Patent No.: US 7,588,651 B2
(45) Date of Patent: Sep. 15, 2009

(54) METHOD FOR PRODUCING A STEEL PRODUCT

(75) Inventors: Bernhard Engl, Dortmund (DE); Thomas Heller, Duisburg (DE); Harald Hofmann, Dortmund (DE); Manfred Menne, Bochum (DE)

(73) Assignee: ThyssenKrupp Steel AG, Duisburg (DE)

( * ) Notice: Subject to any disclaimer, the term of this patent is extended or adjusted under 35 U.S.C. 154(b) by 0 days.

(21) Appl. No.: 10/539,099

(22) PCT Filed: Sep. 18, 2003

(86) PCT No.: PCT/EP03/10365

§ 371 (c)(1),
(2), (4) Date: Jan. 30, 2006

(87) PCT Pub. No.: WO2004/055223

PCT Pub. Date: Jul. 1, 2004

(65) Prior Publication Data

US 2006/0179638 A1     Aug. 17, 2006

(30) Foreign Application Priority Data

Dec. 17, 2002   (DE)  ............................. 102 59 230

(51) Int. Cl.
    *C21D 7/02*     (2006.01)
(52) U.S. Cl. ...................... 148/620; 148/648
(58) Field of Classification Search ............... 148/329
    See application file for complete search history.

(56) References Cited

U.S. PATENT DOCUMENTS

| 3,024,103 | A    |   | 3/1962 | Schmatz |
| H000326   | H    | * | 9/1987 | Brager et al. ............. 420/63 |
| 4,861,390 | A    | * | 8/1989 | Satoh et al. ............. 148/518 |
| 6,358,338 | B1   | * | 3/2002 | Guelton et al. ............. 148/547 |
| 6,387,192 | B1   |   | 5/2002 | Frommeyer et al. |
| 6,695,932 | B2   | * | 2/2004 | Kami et al. ............. 148/320 |
| 6,761,780 | B2   | * | 7/2004 | Morito et al. ............. 148/620 |
| 2003/0145911 | A1 | * | 8/2003 | Hoffmann et al. ............. 148/329 |

FOREIGN PATENT DOCUMENTS

| CA | 2 414 138 A   |   | 12/2002 |
| DE | 197 27 759 A  |   | 1/1999  |
| DE | 199 00 199 A  |   | 7/2000  |
| DE | 199 33 113 C  |   | 9/2000  |
| JP | 58-144418     | * | 8/1983  |
| JP | 04362128 A    | * | 12/1992 |
| WO | 02 46480 A    |   | 6/2002  |

OTHER PUBLICATIONS

English translation of International Preliminary Report on Patentability, Feb. 18, 2005.*
Metals Handbook, 10th Edition, vol. 1, Properties and Selection: Irons, Steels, and High-Performance Alloys, ASM International, 1990, pp. 204-206, 677 and 679-681.*
English abstract of JP 58144418.*
International Search Report for PCT/EP2003/010365 (in English and German), Feb. 28, 2005.
International Preliminary Examination Report for PCT/EP2003/010365 (in German), Feb. 28, 2005.

* cited by examiner

*Primary Examiner*—George Wyszomierski
*Assistant Examiner*—Tima M McGuthry-Banks
(74) *Attorney, Agent, or Firm*—Proskauer Rose LLP

(57) ABSTRACT

The invention provides a method which allows reliable production of steel products from a light steel. The steel products according to the invention exhibit isotropic deformation behavior and are ductile at low temperature with high yield strengths. This is achieved according to the invention by a method for producing a steel product, in particular a steel sheet or steel strip, wherein a steel strip or sheet is produced from steel which contains (in % by weight): C: ≦1.00%, Mn: 7.00 to 30.00%, Al: 1.00 to 10.00%, Si: >2.50 to 8.00 %, Al+Si: >3.50 to 12.00%, B: <0.01%, Ni: <8.00%, Cu: <3.00%, N: <0.60%, Nb: <0.30%, Ti: <0.30%, V: <0.30%, P: <0.01% and iron and unavoidable impurities as the remainder, from which strip or sheet the finished steel product is subsequently produced by cold forming that takes place at a degree of cold forming of 2 to 25%.

16 Claims, No Drawings

METHOD FOR PRODUCING A STEEL PRODUCT

BACKGROUND OF THE INVENTION

The invention relates to a method for producing a steel product which has a high yield strength. The product according to the invention can, in particular, be a steel sheet or a steel strip.

A light steel used for producing body components and for low temperature use is known from DE 197 27 759 C2. In addition to Fe it contains 10% to 30% Mn, 1% to 8% Al and 1 to 6% Si, the total of the Al and Si contents not exceeding 12%. In this known steel carbon is at best contained in the impurities range.

In the light constructional steel known from DE 199 00 199 A1, on the other hand, carbon is provided as an optional alloy element. The known light steel comprises >7% to 27% Mn, >1% to 10% Al, >0.7% to 4% Si, <0.5% C, <10% Cr, <10% Ni and <0.3% Cu. N, V, Nb, Ti and P may also be contained in the steel, wherein the total of these elements must not exceed 2%.

Steels of the above-described type have TWIP properties ("TWIP"="Twinning Induced Plasticity"). This property means that they exhibit high ductility while at the same time having good rigidity and a low weight. Accordingly, an extremely good product can be ascertained from tensile strength and elongation for TWIP light constructional steels. In steel sheets produced from known TWIP light constructional steels the minimum yield strength is conventionally in the range of 260 to 330 MPa.

Even higher yield strengths while simultaneously retaining good ductility can, for example, be achieved with TRIP steels ("TRIP"="Transformation Induced Plasticity") or in steels in which mixed TWIP and TRIP properties exist. However, all variations of known sheets produced from light constructional steels of this type have specific disadvantageous properties when they have yield strengths of more than 330 MPa. Thus, for example, scatterings of the brittle-ductile transition temperature, temperature-dependent properties or an anisotropic deformation behaviour can occur.

BRIEF SUMMARY OF THE INVENTION

The object of the invention therefore consisted in disclosing a method which allows reliable production of steel products from a light steel, which products, even at high yield strengths, have an isotropic deformation behaviour and are ductile at low temperatures.

DETAILED DESCRIPTION OF THE INVENTION

This object is achieved by a method for producing a steel product, in particular a steel sheet or steel strip,
wherein a steel strip or sheet is produced from steel which contains (in % by weight):

| | |
|---|---|
| C: | ≦1.00% |
| Mn: | 7.00 to 30.00% |
| Al: | 1.00 to 10.00% |
| Si: | >2.50 to 8.00% |
| Al + Si: | >3.50 to 12.00% |
| B: | <0.01% |
| Ni: | <8.00% |
| Cu: | <3.00% |
| N: | <0.60% |
| Nb: | <0.30% |
| Ti: | <0.30% |
| V: | <0.30% |
| P: | <0.01% | and iron and unavoidable impurities as the remainder,
from which strip or sheet the finished steel product is subsequently produced by cold forming that takes place at a degree of cold forming of 2 to 25%.

According to the invention, high yield strengths of the finished steel products are adjusted by a cold forming method to which the steel strip is subjected after it has passed through the conventional steel strip production steps. Starting from light steels of the composition stipulated according to the invention products may be produced from both hot strips and cold strips in the manner according to the invention, which products have high yield strengths while still having good ductility. It is essential here that cold forming is carried out with sufficient degrees of forming to conclude the production of the hot or cold strip.

The cold forming according to the invention can, for example, be carried out by skin pass rolling or stretcher-and-roller levelling of the steel sheet or strip. In these cases the product produced according to the invention is a steel strip or sheet, of which the yield strength is regularly above 330 MPa.

These yield strengths which likewise reliably maintain a minimum value may also be achieved in that the cold forming carried out according to the invention is part of a process for producing a finished component form. Thus the cold forming completed in the final step of the method according to the invention may, for example, also be carried out as deep drawing, stretch forming or hydroforming. The only factor which is essential is that an adequate degree of forming is achieved which is above the degree of forming normal in conventional skin pass rolling.

Surprisingly it has been found that, starting from the steel alloy used according to the invention, a clear increase in the yield strengths occurs owing to the cold forming, without subsequent repeated annealing, carried out to conclude the production method, without decisive losses in the isotropy or the ductility of the material occurring as a result. Thus the products produced according to the invention, in particular sheets or strips, are characterised by an optimum combination of ductile yield and yield strength.

In addition, they have TWIP properties. As such they are clearly superior to conventionally produced and composed light steel products. It is therefore possible with the method according to the invention to simply produce light steel products with maximum yield strengths and which are characterised by good ductility at low weight.

The reliability with which the working result made possible according to the invention is achieved can be improved in that the degree of cold forming is 15% maximum, in particular 10% maximum.

Hot strips or cold strips may be used as the starting products for producing steel products according to the invention. The production of hot strips can include the conventional method steps. Thus a steel with the composition according to the invention can be cast to form slabs, thin slabs or cast strip. These fabricated products are then hot rolled to form a hot strip which is wound into coils.

After winding, the hot strip obtained can be cold formed directly in the manner according to the invention into a product according to the invention. Alternatively the hot strip can firstly be cold rolled to form a cold strip which is subsequently recrystallisation annealed before it is subjected to cold forming with degrees of cold forming of 2% to 25%, again as the final step in the method according to the invention.

If reheating is required prior to hot rolling, in particular in the case of the use of slabs, the reheating temperature should not be below 1,100 C. On the other hand, in such cases in which, after casting, the starting product is fed to the hot rolling operation in a continuous operations sequence, this can also take place in direct use without interposed reheating.

As, according to the invention, the hot strip is hot rolled at final hot rolling temperatures of at least 800 C and is wound at low temperatures, the positive effect of the carbon, and if it is present, in particular the boron, is used in full. Thus in sheets hot rolled in this range boron and carbon cause higher tensile strength and yield strength values at ductile yield values that are still acceptable. Tensile strength and yield strength decrease with increasing final hot rolling temperature, while the elongation values increase. By varying final the rolling temperatures within the framework stipulated by the invention, the desired properties of the steel sheet obtained may thus be influenced in a targeted and simple manner.

Embrittlement of the material is reliably avoided by limiting the winding temperature to values of 700 C maximum. It has been established that at elevated winding temperatures the formation of brittle phases can occur which, for example, can result in flaking of material and as such make further processing difficult or even impossible.

If the steel product is produced from a cold strip, the degree of cold rolling during cold rolling preceding recrystallisation annealing is preferably in the range of 30% to 75% in order to reliably attain the optimised ductility and rigidity properties of the finished steel product according to the invention.

The annealing temperatures during recrystallisation annealing is preferably between 600 C and 1,100 C. Annealing can be carried out in a bell-type annealing furnace in the temperature range from 600 C to 750 C or in a continuous annealing furnace at temperatures from 750 C to 1,100 C.

As a result of the Si contents restricted to contents above 2.50% by weight, preferably above 2.70% by weight, steel sheets according to the invention exhibit improved capacity for cold rolling compared with light steel sheets or steel sheets of this type which have lower Si contents. The high addition of Si is expressed in more uniform yield strength and tensile strength values and in higher ductile yield and uniform elongation values. Furthermore, in steels according to the invention, silicon leads to higher r and n values and to an isotropic formation of the mechanical properties. The upper limit of the total formed from Al and Si contents lies at 12% as a Al and Si contents total that goes beyond this limit would entail the risk of embrittlement.

Surprisingly it has been found that the purposeful addition of boron to steels according to the invention can lead to an improvement in the properties and the producability. Therefore, according to an advantageous configuration of the invention it is provided that the steel comprises boron. If boron is added to improve the adjustment of yield strength and ductility, the boron content can, in this respect, lie in the range of 0.002% by weight to 0.01% by weight, in particular 0.003 to 0.008% by weight.

The advantageous effects of the alloy on the mechanico-technologial properties of steel sheets according to the invention can be boosted further if a minimum amount of 0.10% by weight carbon can be detected in the steel according to the invention.

As a result of its particular property spectrum, crash-relevant vehicle body components and vehicle body components that are particularly supportive may be produced from cold strip products produced, in particular, in a manner according to the invention. These components can be used, with a low weight, for example for particularly effective protection of the occupants of a vehicle. Products produced according to the invention are characterised in this connection by a particularly high energy absorption capacity in the event of a sudden load.

The low weight with good ductility and rigidity at the same time also make it possible to produce wheels for vehicles, in particular motor vehicles, from products produced according to the invention.

Components which are used in the field of low temperature engineering may also be produced from products produced according to the invention. The advantageous property spectrum of cold strip products produced according to the invention is retained even at low temperatures conventional in the cryotechnics sector.

The good energy absorption capacity achieved with the method of production according to the invention also makes the method of the invention particularly suitable for producing products which are used for producing protective elements intended for protection against impulse-type loads.

The invention will be described hereinafter with reference to embodiments.

A light steel comprising (details in % by weight) 0.0070% C, 25.9% Mn, 0.013% P, 0.0006% S, 2.83% Si, 2.72% Al, 0.0045% N and the remainder being iron and unavoidable impurities, which include, for example, small contents of Cu, Cr, Ni, As, Sn, Ti, V, Nb, B and Mg, was cast to form slabs.

After reheating to 1,150 C the slabs were hot rolled at a final hot rolling temperature of 850 C to form a hot strip and then wound at a winding temperature of 500 C. The hot strip was then cold rolled, at a degree of forming of 65%, to form a cold strip 1 mm thick. After cold rolling, the cold strip was recrystallisation annealed in a continuous annealing furnace at a temperature of 950 C.

In this state the cold strip was isotropic. Its mechanical properties ascertained in the longitudinal direction in each case are entered in Table 1 (degree of cold forming=0%).

TABLE 1

| Degree of cold forming [%] | $R_{p0.2}$ [MPa] | $R_m$ [MPa] | $A_g$ [%] | $A_{80}$ [%] | n | r |
|---|---|---|---|---|---|---|
| 0 | 326 | 657 | 52.8 | 58.8 | 0.373 | 0.93 |
| 2.5 | 400 | 675 | 47.5 | 53.4 | 0.307 | 0.90 |
| 5 | 464 | 699 | 41.8 | 48.2 | 0.257 | 0.85 |
| 10 | 568 | 748 | 30.9 | 40.5 | 0.199 | 0.80 |
| 30 | 870 | 1039 | 3.0 | 12.1 | — | — |
| 50 | 1051 | 1225 | 2.9 | 5.4 | — | — |

To prove the effect of the invention, after recrystallisation annealing, portions of the cold strip were cold rolled with a degree of forming of 2.5%, 5%, 10%, 30% and 50%. The mechanical properties ascertained in the longitudinal direction in each case for each of the portions are also entered in Table 1.

It appears that in the cold strip product obtained after skin pass rolling, an optimum combination of elongation limits and yield strengths is obtained if a degree of cold forming of 10% was maintained during skin pass rolling of the cold strip. Thus up to a degree of cold forming of 10% the yield strength $R_{p0.2}$ could be increased by more than 70% and the tensile strength $R_m$ improved by more than 10%. The values of the uniform elongation $A_g$, the $A_{80}$ elongation, the r value and the n value remained at a level which is far above that which is achieved in conventional steels of comparable yield strength. Only at a degree of cold forming of 30% does a dramatic decrease in the elongation properties occur.

In a further test a further cold strip corresponding, with respect to its composition and the working steps completed until conclusion of its recrystallisation annealing, to the cold strip described above was produced. A hollow profile-like crash body was produced from a portion of this cold strip, without prior cold forming. A further portion of the recrystallisation annealed cold strip, by contrast, was cold formed by skin pass rolling in a manner according to the invention with a degree of cold forming of 7%. A hollow profile-like crash body was then likewise produced from the cold strip product produced according to the invention in this way.

The two crash bodies, weighing approximately 150 kg, were then investigated with respect to their energy absorption capacity in a drop test in which they hit an obstacle at a rate of fall of 50 k m/h. It appeared that the crash body produced from the cold strip product skin pass rolled according to the invention had a much better energy absorption capacity, despite the fact that its wall thickness was much reduced, compared with that of the other crash body, owing to the additional cold forming.

Finally, in a third test a recrystallisation annealed cold strip was produced, again based on the above-stated composition and by using the method steps already described. The thus composed cold strip was then cold formed in the manner according to the invention by stretch forming. The degree of cold forming achieved in the process was again 10%. As a result of this cold forming the yield strength of 320 MPa could be increased only in the recrystallisation annealed state to 520 MPa after the cold forming following recrystallisation annealing. The tensile strengths simultaneously increased from 640 MPa to 710 MPa. The r value was barely affected. With an increasing degree of forming the elongation values decreased from 60% to about 50% and the n value from 0.39 to 0.27 but even these values were much higher than the elongation properties and n values that can be determined in comparable conventionally produced steels which are more rigid and of the same yield strength class. Even in the case of cold forming of the cold strip by skin pass rolling, the product obtained thus had an optimum combination of yield strength values and elongation values.

The invention claimed is:

1. Method for producing a steel product with a high yield strength,
   wherein a steel strip or sheet is produced from steel which contains (in % by weight):

| | |
   |---|---|
   | C: | ≦1.00% |
   | Mn: | 7.00 to 30.00% |
   | Al: | 1.00 to 10.00% |
   | Si: | >2.50 to 8.00% |
   | Al + Si: | >3.50 to 12.00% |
   | B: | <0.01% |
   | Ni: | <8.00% |

-continued

| | |
   |---|---|
   | Cu: | <3.00% |
   | N: | <0.60% |
   | Nb: | <0.30% |
   | Ti: | <0.30% |
   | V: | <0.30% |
   | P: | <0.01% | and iron and unavoidable impurities as the remainder,
   which strip or sheet is cold rolled to form a cold rolled strip,
   from which the steel product is subsequently produced by cold forming that takes place at a degree of cold forming of 2.5 to 25%.

2. Method according to claim 1, characterized in that the degree of cold forming is 15% maximum.

3. Method according to claim 2, characterized in that the degree of cold forming is 10% maximum.

4. Method according to claim 1, characterized in that production of the steel strip or sheet comprises the following working steps:
   casting the steel to form an ingoing material, such as slabs, thin slabs or a cast strip,
   hot rolling the ingoing material to form a hot strip,
   winding the hot strip,
   cold rolling the hot strip to form the cold strip.

5. Method according claim 4, characterized in that the ingoing material is reheated to at least 1100° C. before hot rolling.

6. Method according to claim 4, characterized in that the ingoing material is used directly for hot rolling at a temperature of at least 1100° C.

7. Method according to claim 4, characterized in that the end temperature of the hot rolling is at least 800° C.

8. Method according to claim 4, characterized in that the winding temperature is 450° C. to 700° C.

9. Method according to claim 4, characterized in that, after cold rolling, the cold strip is recrystallization annealed, and in that, after recrystallization annealing, the cold strip is finish cold formed.

10. Method according to claim 9, characterized in that recrystallization annealing is carried out at an annealing temperature of 600° C. to 1100° C.

11. Method according to claim 10, characterized in that recrystallization annealing is carried out as bell-type annealing at a annealing temperature of 600° C. to 750° C.

12. Method according to claim 10, characterized in that annealing is carried out at an annealing temperature of 750° C. to 1100° C.

13. Method according to claim 12, characterized in that cold rolling is carried out at a degree of cold rolling of 30% to 75%.

14. Method according to claim 1, characterized in that the steel contains more that 2.70% by weight silicon.

15. Method according to claim 11, characterized in that the steel contains 0.002% by weight to less than 0.01% by weight boron.

16. Method according to claim 15, characterized in that the steel contains 0.003 to 0.008% by weight boron.

* * * * *